US007821676B2

(12) United States Patent
Wang et al.

(10) Patent No.: US 7,821,676 B2
(45) Date of Patent: Oct. 26, 2010

(54) METHOD OF PROCESSING AND OPERATING VIDEO SURVEILLANCE SYSTEM

(75) Inventors: Chao-Ming Wang, Taipei (TW); Hsu-Tung Chen, Taipei Hsien (TW)

(73) Assignee: Huper Laboratories Co., Ltd., Taipei (TW)

( * ) Notice: Subject to any disclaimer, the term of this patent is extended or adjusted under 35 U.S.C. 154(b) by 1382 days.

(21) Appl. No.: 11/163,061

(22) Filed: Oct. 4, 2005

(65) Prior Publication Data

US 2006/0152584 A1 Jul. 13, 2006

(30) Foreign Application Priority Data

Jan. 11, 2005 (TW) ............................... 94100728 A

(51) Int. Cl.
*H04N 1/04* (2006.01)
(52) U.S. Cl. .................... 358/474; 358/482; 358/909.1; 382/285; 348/143; 348/36; 348/240.99
(58) Field of Classification Search ................. 358/474, 358/482, 483, 1.9, 513, 514, 906, 909.1; 382/285, 154, 103; 348/143, 36, 240.99, 348/159, E7.085, 164, 169
See application file for complete search history.

(56) References Cited

U.S. PATENT DOCUMENTS

| | | | | | |
|---|---|---|---|---|---|
| 5,164,827 | A | * | 11/1992 | Paff | 348/143 |
| 7,586,655 | B1 | * | 9/2009 | Uhlik et al. | 358/497 |
| 7,605,844 | B1 | * | 10/2009 | Page et al. | 348/207.99 |
| 7,706,028 | B2 | * | 4/2010 | Pishdadian et al. | 358/474 |
| 2003/0095687 | A1 | * | 5/2003 | Montgomery | 382/103 |
| 2003/0117670 | A1 | * | 6/2003 | Brugger et al. | 358/474 |
| 2004/0012825 | A1 | * | 1/2004 | Tesavis | 358/474 |
| 2004/0257444 | A1 | * | 12/2004 | Maruya et al. | 348/169 |
| 2005/0104962 | A1 | * | 5/2005 | Han et al. | 348/143 |
| 2005/0128291 | A1 | * | 6/2005 | Murakami | 348/143 |
| 2008/0074494 | A1 | * | 3/2008 | Nemethy et al. | 348/143 |
| 2008/0231709 | A1 | * | 9/2008 | Brown et al. | 348/169 |
| 2009/0322874 | A1 | * | 12/2009 | Knutson et al. | 348/143 |
| 2010/0002070 | A1 | * | 1/2010 | Ahiska | 348/36 |
| 2010/0039680 | A1 | * | 2/2010 | Yoon et al. | 358/474 |

* cited by examiner

*Primary Examiner*—Negussie Worku
(74) *Attorney, Agent, or Firm*—Winston Hsu; Scott Margo; Min-Lee Teng

(57) ABSTRACT

A method to calculate a transform coordinate on a second video of an object having an target coordinate on a first video and related operation process and video surveillance system are disclosed. The method includes the steps of generating the first video with a first video surveillance device, generating the second video with a second video surveillance device, selecting a first predetermined number of first reference objects also existing on the second video from the first video, calculating a plurality of coordinate transform coefficients of a first coordinate transform function according to the first predetermined number of first coordinates where the first reference objects are on the first video and the first predetermined number of second coordinates where the first reference objects are on the second video, and substituting the target coordinate into the first coordinate transform function, which had the first coordinate transform coefficients, and calculating the transform coordinate.

39 Claims, 4 Drawing Sheets

METHOD OF PROCESSING AND OPERATING VIDEO SURVEILLANCE SYSTEM

BACKGROUND OF THE INVENTION

1. Field of the Invention

The present invention relates to a video surveillance system, and more particularly, to a method for calculating a transform coordinate on a second video of an object having a target coordinate on a first video and related operation process and video surveillance system.

2. Description of the Prior Art

In recent years, due to the explosive development of video processing technology and abrupt reduction of hardware expense, a video surveillance system, such as a camera, is becoming one of the most popular electronic devices.

Concerning whether or not having a Pan/Tilt/Zoom (PTZ) function, cameras can be categorized into two types: fixed and PTZ cameras.

A fixed camera has the capability to keep any suspicious people in an environment where the fixed camera is installed under surveillance. However, despite the surveillance of an intruder existing in the environment, the fixed camera, without the PTZ function, still cannot provide sufficient information about the intruder if a video of the intruder is located in a corner of a fixed video generated by the fixed camera, or the intruder stands far from the fixed camera and the video of the intruder is too small to be identified.

A PTZ camera is designed to overcome the above problems. When detecting that an intruder existing in an environment where the PTZ camera is installed, the PTZ camera moves a video of the intruder to a central region of a PTZ video generated by the PTZ camera with the Pan/Tilt function, and zooms in the video of the intruder with the Zoom function. In result, a user of the PTZ camera can see a face of the intruder clearly and identify the intruder.

However, in the process of moving and zooming-in the video of the intruder, the PTZ camera has no further strength to spare for monitoring another intruder existing in the environment. In short, the PTZ function of the PTZ camera is realized at the expense of a looking-around capability of monitoring all suspicious people in the environment.

Please refer to FIG. 1, which is a schematic diagram of a video surveillance system 10 having both of the looking-around capability of the fixed camera and the PTZ capability of the PTZ camera according to the prior art. The video surveillance system 10 comprises a metal rod 12, a fixed camera 14 fixed on a first end of the metal rod 12, and a PTZ camera 16 fixed on a second end of the metal rod 12. The fixed camera 14 and the PTZ camera 16 are electrically connected together and face toward an identical predetermined direction.

The surveillance process of the video surveillance system 10 on suspicious people in an environment where the video surveillance system 10 is installed is described in brief as follows: When an intruder 22 intrudes in the environment, a video 24 of the intruder 22 will appear in a fixed image plane 18 generated by the fixed camera 14. A target coordinate (x,y) is assumed to be a position where the video 24 is located in the fixed image plane 18, and a transform coordinate (x',y') is assumed to be another position where a video 26 of the intruder 22 is located in a PTZ image plane 20 generated by the PTZ camera 16; Then, the PTZ camera 16 moves a video on a correcting coordinate $(x_D, y_D)$ of the PTZ image plane 20 to a central region of the PTZ image plane 20 with the Pan/Tilt function, and zooms in a video in the central region of the PTZ image plane 20 with the Zoom function. Due to a disparity factor resulting from the fact that the fixed camera 14 is located from the PTZ camera 16 by a finite distance of the length of the metal rod 12, the correcting coordinate $(x_D, y_D)$ is not exactly equal to the target coordinate (x,y). That is to say, the correcting coordinate $(x_D, y_D)$ is derived from the target coordinate (x,y) after taking the disparity factor into account.

Since the fixed camera 14 and the PTZ camera 16 are both fixed to the metal rod 12 and face toward the predetermined direction, and the disparity factor is negligible due to too short the length of the metal rod 12, the correcting coordinate $(x_D, y_D)$ is approximately equal to the transform coordinate (x',y'), and the PTZ camera 16, in equivalent, shifts and zooms in the video 26 located on the transform coordinate (x',y') of the PTZ image plane 20.

Therefore, a user of the video surveillance system 10 can still monitor another intruder existing in the environment at a time when the user is watching the clear Panned/Tilted/Zoomed intruder's 22 face displayed on the PTZ image plane 20.

However, since the PTZ camera 16 is installed according to a coordinate where the video 24 of the intruder 22 is located in the fixed image plane 18, that is not the transform coordinate (x',y') but the target coordinate (x,y), to PTZ a video located on the correcting coordinate $(x_D, y_D)$ of the PTZ image plane 20, the fixed camera 14 cannot be installed far from the PTZ camera 16, and the metal rod 12 cannot be too long, or what the PTZ camera PTZs is not the video 26 or a video neighboring the video 26, but another unexpected video far from the video 26 of the PTZ image plane 20. The user therefore will not see the intruder's 22 face in the PTZ image plane 20 generated by the PTZ camera 16.

Moreover, since the fixed camera 14, and the PTZ camera 16 as well, is fixed to the metal rod 12 to generate a video, and the length of the metal rod 12 has a close relation with the disparity factor of the fixed camera 14 and the PTZ camera 16, the video surveillance system 10 has to be adjusted elaborately before handed over to a user, so that the PTZ camera 16 can PTZ the video 26 as precise as possible. On the other hand, the fixed camera 14 and the PTZ camera 16 of the elaborately adjusted video surveillance system 10 can be applied nowhere but fixed to the metal rod 12. In consequence, the video surveillance system 10 has a fixed disposition of the fixed camera 14 and the PTZ camera 16 on the metal rod 12, and neither the fixed camera 14 nor the PTZ camera 16 can be installed on another position of the metal rod 12 to meet a user's special demand.

In last, since the video surveillance system 10 cannot function well without the elaborately adjusting process, and the fixed camera 14 of the well-adjusted video surveillance system 10 cannot operate together with another PTZ camera but the PTZ camera 16 only, the video surveillance system 10 including the fixed camera 14 and the PTZ camera 16 cannot be sold in pieces, but in a whole set.

SUMMARY OF THE INVENTION

It is therefore a primary objective of the claimed invention to provide a method for calculating a transform coordinate on a second video of a target object having a target coordinate on a first video and related operation process and video surveillance system, so as to overcome the problems of prior art. After the method calculates the transform coordinate of the target object on the second video, a video located on the transform coordinate, rather than the target coordinate, of the second video can be panned-tilted-zoomed. Therefore, the panned-tilted-zoomed video is a video near the target object, rather than a video far from the target object.

According to the claimed invention, the method includes the following steps of: generating the first video with a first video surveillance device; generating the second video with a second video surveillance device; selecting a first predetermined number of first reference objects existing in both of the first and the second videos; calculating a plurality of first coordinate transform coefficients of a first coordinate transform function according to a first coordinate where the first reference objects are located in the first video and a second coordinate where the first reference objects are located in the second video; and substituting the target coordinate into the first coordinate transform function, which has the first coordinate transform coefficients, and calculating the transform coordinate.

According to the preferred embodiment, the first coordinate transform function can be a Helmert coordinate transform function, an Affine coordinate transform function, a second-ordered coordinate transform function, a Projection coordinate transform function, a Pseudo Affine coordinate transform function, or a polynomial coordinate transform function $$\left( x_1 = \sum_i \sum_j a_{ij} x^{i-1} y^{j-1}, \ y_1 = \sum_i \sum_j b_{ij} x^{i-1} y^{j-1} \right).$$

The first predetermined number can be equal to four, six, eight, or a total sum of $a_{ij}$ and $b_{ij}$. The first video device can be a fixed camera or a Pan/Tilt/Zoom (PTZ) camera; The second video device can be a fixed camera or a PTZ camera; The PTZ camera can perform one, two, or all of three functions of a Pan function, a Tilt function, and a Zoom function.

The method of the present invention further includes the following steps of: providing a third video surveillance device; generating a third video with the third video surveillance device; selecting a second predetermined number of second reference objects existing in both of the first and the third videos; calculating a plurality of second coordinate transform coefficients of a second coordinate transform function according to a fourth coordinate where the second reference objects are located in the first video and a third coordinate where the second reference objects are located in the third video; and substituting the target coordinate into the second coordinate transform function, which has the second coordinate transform coefficients, and calculating a transform coordinate where the target object is located in the third video.

It is an advantage of the claimed invention that through a panning-tilting-zooming process on a video of the second video located on the transform coordinate the method calculates, a user of a video surveillance system for implementing the method can see an intruder's face clearly, and at the same time monitor another intruder existing in an environment where the video surveillance system is installed.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
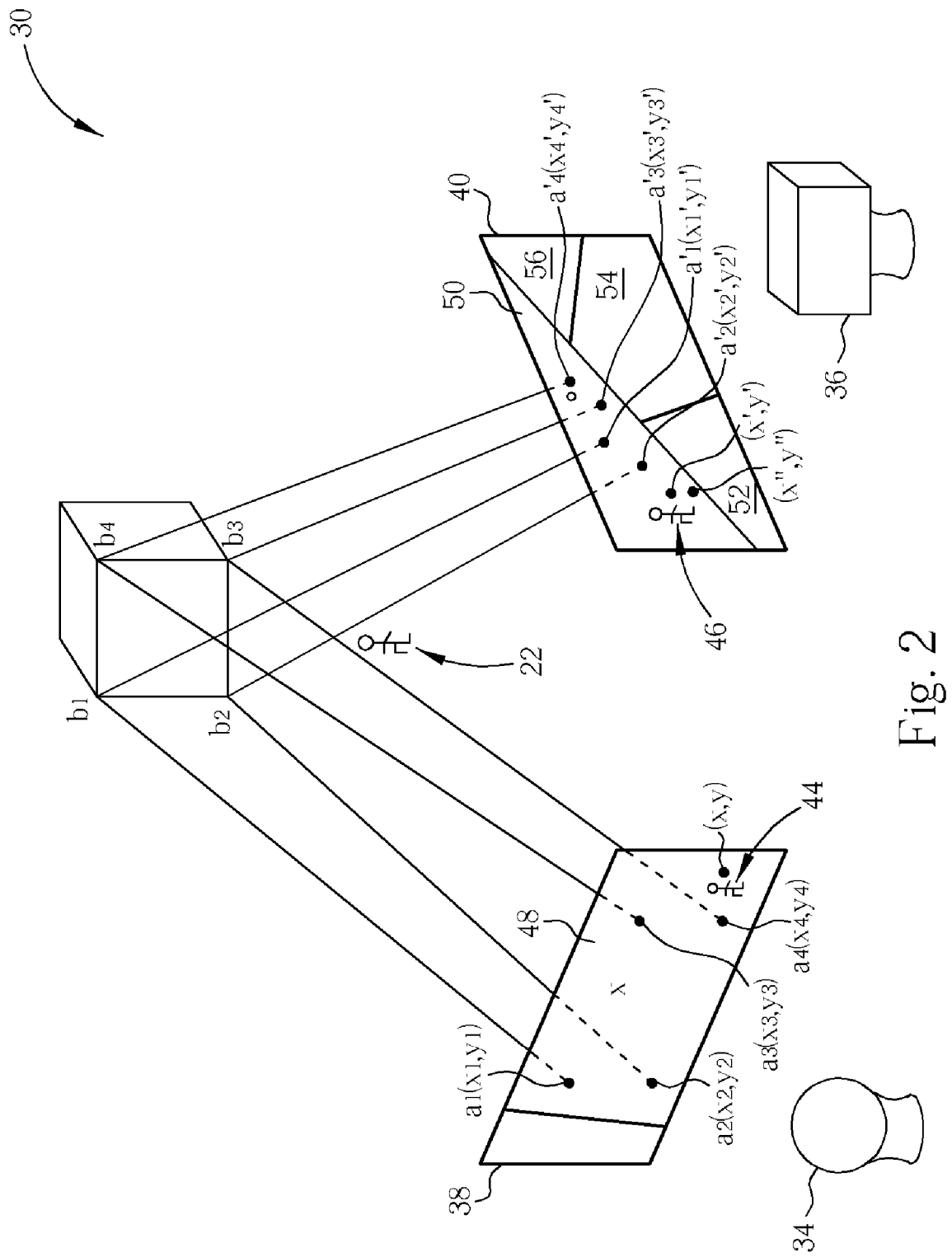
FIG. 2 is a schematic diagram of a video surveillance system of the preferred embodiment according to the present invention.

Please refer to FIG. 2, which is a schematic diagram of a video surveillance system 30 of the preferred embodiment according to the present invention. The video surveillance system 30 comprises a fixed camera 34, and a PTZ camera 36 electrically connected to the fixed camera 34. The fixed camera 34 is installed to calculate a target video's (for example a video 44) target coordinate (for example (x,y)) where a target object (for example the intruder 22) corresponding to the target video is located on a fixed image plane 38 generated by the fixed camera 34, and to calculate a candidate transform coordinate (for example (x",y")), around where a transform video (for example a video 46) of the target object (the intruder 22) is located on a PTZ image plane 40 generated by the PTZ camera 36.

Figure 1:
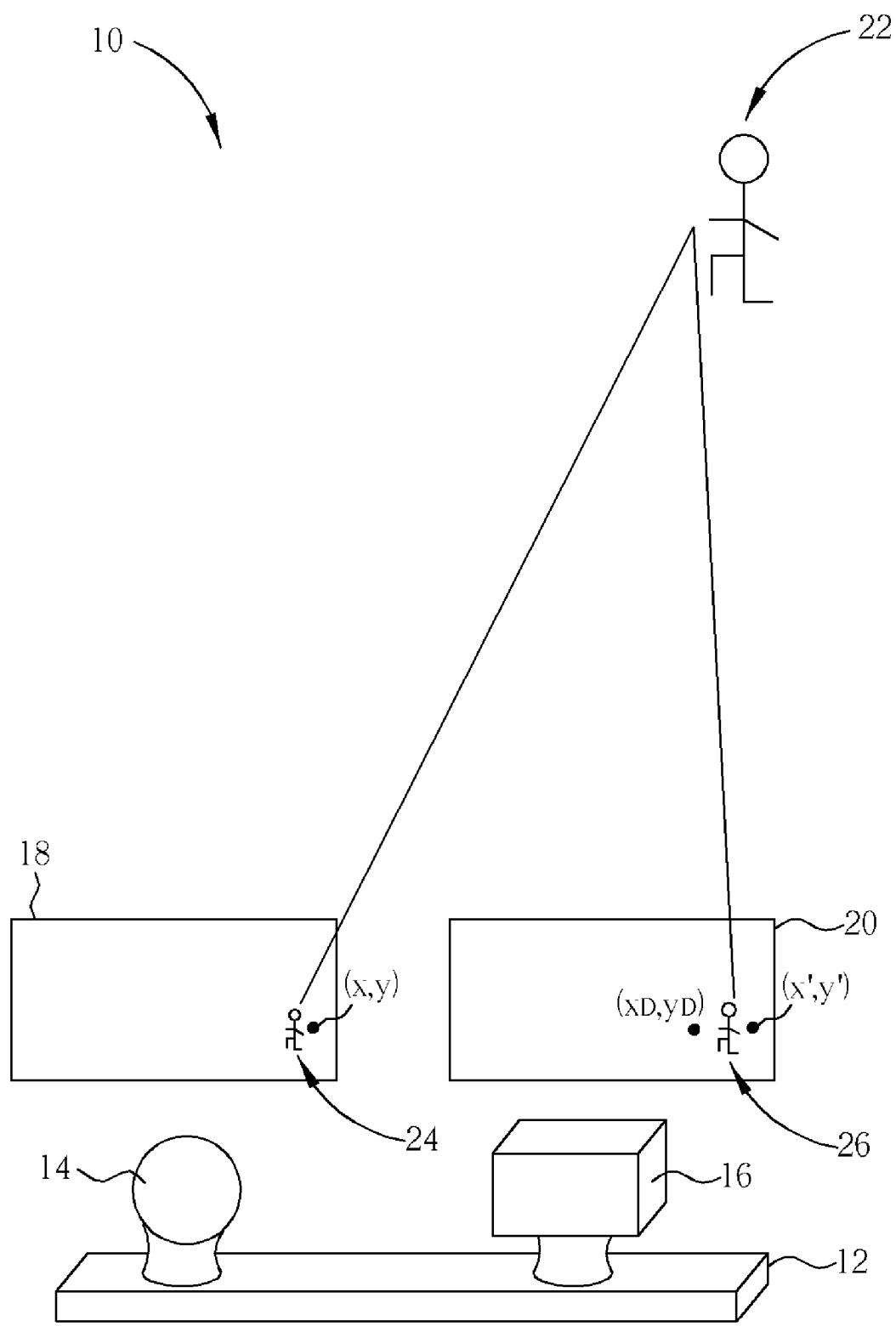
FIG. 1 is a schematic diagram of a video surveillance system according to the prior art.

Please note that, different from the video surveillance system 10, which has a fixed disposition of the fixed camera 14 and the PTZ camera 16, the video surveillance system 30 has a variable disposition of the fixed camera 34 and the PTZ camera 36, so as to meet any specific demands. In practice, the PTZ camera 36 is not necessary to be installed in a region very close to the fixed camera 34, like the PTZ camera 16 shown in FIG. 1, which is installed nearby the fixed camera 14, as long as the PTZ image plane 40 generated by the PTZ camera 36 consists of a video of an object existing in the fixed image plane 38 generated by the fixed camera 34.

A surveillance process of the video surveillance system 30 on suspicious people in an environment where the video surveillance system 30 is installed is described in brief as follows: When the intruder 22 intrudes in the environment, the video 44 of the intruder 22 will appear in the fixed image plane 18 generated by the fixed camera 34. A target coordinate (x,y) is assumed to be a position where the video 44 is located in the fixed image plane 38, and a transform coordinate (x',y') is assumed to be another position where the video 46 of the intruder 22 is located in the PTZ image plane 40 generated by the PTZ camera 36. Different from the transform coordinate (x',y') of the video surveillance system 10, which is approximately equal to correcting coordinate (x,y) because the fixed camera 14 has to be installed in a region very close to the PTZ camera 16, the transform (x',y') of the video surveillance system 30 can be quite different from the correcting coordinate (x,y). As shown in FIG. 2, the video 44 of the target coordinate (x,y) is located in a right bottom corner of the fixed image plane 38, while the video 46 of the transform coordinate (x',y') is located in a left half part of the video 46; Then, the fixed camera 34 calculates the target coordinate (x,y) where the fixed image plane 38 of the intruder 22 is located on the fixed image plane 38, and substitutes the target coordinate (x,y) into a coordinate transform function having a plurality of predefined coordinate transform coefficients to obtain the candidate coordinate (x",y"), which is equal to a function value of the coordinate transform function when the when the target coordinate (x,y) is substituted into the coordinate transform function. Please note that the candidate transform coordinate (x",y") is not necessarily equal to the transform coordinate (x',y'), but a difference between them is small; In last, the PTZ camera 36 moves the video located on the candidate transform coordinate (x",y") to a central region of the PTZ image plane 40 with the Pan/Tilt function, and enlarges (or reduces if the video 44 of the intruder 22 occupies the whole fixed image plane 38, and a user of the video surveillance system 30 wants to see objects around the intruder 22) the video having been shifted to the central region of the PTZ image plane 40. The PTZ camera 36, in equivalent, PTZs the video 46 of the intruder 22 on the PTZ image plane 40, for the candidate transform coordinate (x",y") is approximately equal to the transform coordinate (x',y').

In such a scenario described above, a user of the video surveillance system 30 can see the intruder's 22 face clearly in the panned-tilted-zoomed PTZ image plane 40 generated by the PTZ camera 36.

In the surveillance process described previously, the coordinate transform function can be a Helmert coordinate transform function ($x_1=ax+by+c$, $y_1=-bx+ay+d$, where a, b, c, and d are four distinct coefficients), an Affine coordinate transform function ($x_1=ax+by+c$, $y_1=dx+ey+f$, where a, b, c, d, e, and f are six distinct coefficients), a Pseudo Affine coordinate transform function ($x_1=a_1xy+a_2x+a_3y+a_4$, $y_1=a_5xy+a_6x+a_7y+a_8$, where $a_1$ to $a_8$ are eight distinct coefficients), a Projection coordinate transform function $$\left(x_1 = \frac{a_1x + a_2y + a_3}{a_7x + a_8y + 1}, y_1 = \frac{a_4x + a_5y + a_6}{a_7x + a_8y + 1},\right.$$

where $a_1$ to $a_8$ are eight distinct coefficients), a second-ordered coordinate transform function ($x_1=a_1x+a_2y+a_3(x^2-y^2)+2a_4xy+a_5$, $y_1=a_2x+a_1y-a_4(x^2-y^2)+2a_3xy+a_6$, where $a_1$ to $a_6$ are six distinct coefficients), or a Polynomial coordinate transform function $$\left(x_1 = \sum_i \sum_j a_{ij} x^{i-1} y^{j-1}, y_1 = \sum_i \sum_j b_{ij} x^{i-1} y^{j-1},\right.$$

where $a_{ij}$ and $b_{ij}$ are two of a total sum of $a_{ij}$ and $b_{ij}$ distinct coefficients). The predefining process of the coefficients of the coordinate transform function is described as follows.

For example, the Projection coordinate transform function, which has eight distinct coefficients to be predefined, needs eight equations to determine the eight coefficients uniquely. First, select four videos (a first video $a_1$, a second video $a_2$, a third video $a_3$, and a fourth video $a_4$, which correspond to four objects—a first object $b_1$, a second object $b_2$, a third object $b_3$, and a fourth object $b_4$ existing in the fixed image plane 38 respectively) in the fixed image plane 38. These four objects $b_1$ to $b_4$ are four approximately planar objects in the environment where the video surveillance system 30 is installed; Then, substitute eight coordinates (shown in FIG. 2, $(x_1,y_1)$, $(x_2,y_2)$, $(x_3,y_3)$, $(x_4,y_4)$, $(x_1',y_1')$, $(x_2',y_2')$, $(x_3',y_3')$, and $(x_4',y_4')$) corresponding to the first video $a_1$, the second video $a_2$, the third video $a_3$, the fourth video $a_4$, a first video $a_1'$, a second video $a_2'$, a third video $a_3'$, and a fourth video $a_4'$ into the Projection coordinate transform function, and calculate the eight coefficients $a_1$ to $a_8$, the first video $a_1'$, the second video $a_2'$, the third video $a_3'$, and the fourth video $a_4'$ corresponding to the first object $b_1$, the second object $b_2$, the third object $b_3$, and the fourth object $b_4$ existing in the PTZ image plane 40 respectively.

In the process described above, the selected first video $a_1$, the second video $a_2$, the third video $a_3$, and the fourth video $a_4$ are all located in an overlapped fixed video 48 having a plurality of videos, each of which corresponding to an object also existing in an overlapped PTZ video 50 of the PTZ image plane 40. Otherwise, if at least one of the four videos is selected in a region outside of the overlapped fixed image plane 40, it is impossible to select another four corresponding videos in the PTZ image plane 40. Moreover, the first video $a_1$, the second video $a_2$, the third video $a_3$, and the fourth video $a_4$ had better been located far away from each other in a peripheral region of the overlapped fixed video 48. Therefore, the candidate transform coordinate (x",y") through the calculation of the coordinate transform function can approach the transform coordinate (x',y') as close as possible, and a user of the video surveillance system 30 can see the intruder's 22 face in the PTZed PTZ image plane 40 generated by the PTZ camera 36.

Of the preferred embodiment, the video surveillance system 30 comprises one fixed camera, i.e. the fixed camera 34, and one PTZ camera, i.e. the PTZ camera 36. However, a video surveillance system of the present invention can comprise:

a) two fixed cameras, one of which serves as the PTZ camera 36. Though the fixed camera serving as the PTZ camera 36 lacks of the PTZ capability, but the other fixed camera still can calculate a target coordinate of a target video of a target object existing in a fixed video generated by the fixed camera, and calculate a corresponding candidate transform coordinate;

b) two PTZ camera, one of which serve as the fixed camera 34. The PTZ camera serving as the fixed camera has the capability to calculate a target coordinate of a target video of a target object existing in a fixed video generated by the fixed camera, and to calculate a corresponding candidate transform coordinate;

c) the fixed camera 34 and a plurality of PTZ cameras. The fixed camera 34 has a capability to predefine a plurality of transform coordinate coefficients of a plurality of transform coordinate functions corresponding to the PTZ cameras respectively, and to calculate a plurality of corresponding candidate transform coordinates;

d) the PTZ camera 36 and a plurality of fixed cameras, one of which serves as the fixed camera 34. In addition to the overlapped PTZ video 50, the PTZ image plane 40 generated by the PTZ camera 36 further comprises a PTZ video 52, a PTZ video 54, and a PTZ video 56 corresponding to the fixed cameras besides the fixed camera 34. Any one of the fixed cameras has the capability to predefine a plurality of coordinate transform coefficients of a coordinate transform function corresponding to the fixed camera and its corresponding PTZ camera, and to calculate a candidate transform coordinate. Therefore, even though the video 46 of the intrude 22 is existing in the overlapped PTZ videos 52, 54, and 56, a user can still see the panned-tilted-zoomed intruder's 22 face in the PTZ image plane 40 generated by the PTZ camera 36; and e) a plurality of fixed cameras and a plurality of PTZ cameras, combining in equivalent the above (a), (b), (c), and/or (d).

Of the preferred embodiment, the PTZ camera 36 of the video surveillance system 30 can be replaced with a PTZ camera not having all of the three functions—the Pan, the Tilt, and the Zoom function. The replaced PTZ camera can have only two, one, or even none, like the fixed camera serving as the PTZ camera 36 in (a), of the three functions.

The present invention can be widely applied to a variety of electronic apparatuses. For example, if the fixed image plane 38 generated by the fixed camera 34 and the PTZ image plane 40 generated by the PTZ camera 36 of the video surveillance system 30 are displayed on a fixed display apparatus and on a PTZ display apparatus respectively, when a user selects any fixed points (for example a fixed point x shown in FIG. 2) of the overlapped fixed video 48 of the fixed image plane 38 displayed on the fixed display apparatus with a mouse, a PTZ point o, which has a PTZ coordinate and is of course located in the overlapped PTZ video 50, will appear immediately on the PTZ display apparatus, for the fixed camera 34 can calculate a fixed coordinate of the fixed point x, and calculate the PTZ coordinate of the PTZ point o through the substitution of the fixed coordinate into the coordinate transform function.

The operation process of the video surveillance system 30, functioning together with the fixed display apparatus and the PTZ display apparatus, is described as follows: (1) Selecting on the fixed display apparatus with the mouse four approximately planar reference videos respectively corresponding to four approximately planar reference objects. As shown in FIG. 2, these four reference videos are a first video $a_1$, a second video $a_2$, a third video $a_3$, and a fourth video $a_4$ in the fixed image plane 38, which correspond a first object $b_1$, a second object $b_2$, a third object $b_3$, and a fourth object $b_4$ respectively. The fixed camera 34 calculates four reference coordinates of the four reference videos; (2) Selecting on the PTZ display apparatus with the mouse four corresponding videos of the four reference objects. As shown in FIG. 2, these four corresponding videos are a first video $a_1'$, a second video $a_2'$, a third video $a_3'$, and a fourth video $a_4'$ in the PTZ image plane 40. The PTZ camera 36 calculates four corresponding coordinates of the four corresponding videos; (3) Substituting the above eight coordinates into the Projection coordinate transform function, and obtaining eight transform coefficients from $a_1$ to $a_8$. So far, the video surveillance system 30 is initialized completely; (4) Selecting on the fixed display apparatus the fixed point x, which is located on a plane formed by the four reference objects, and the PTZ point o, which has the PTZ coordinate, appears immediately on the PTZ display apparatus, for the fixed camera 34 can calculate a fixed coordinate of the fixed point x, and calculate the PTZ coordinate of the PTZ point o through the substitution of the fixed coordinate into the Projection coordinate transform function.

The present invention can be applied to an electronic map. In practice, based on a characteristic that feet of the intruder 22 and the ground where the intruder 22 are coplanar, like the fixed point x, if the fixed coordinate of the feet of the intruder 22 on the image plane is known, a corresponding PTZ coordinate of the feet of the intruder 22 on the image plane 40 can be calculated through the use of the Projection coordinate transform function. Therefore, a user of the electronic map is able to know the exact position where the intruder 22 stays on the image plane 40.

Figure 3:
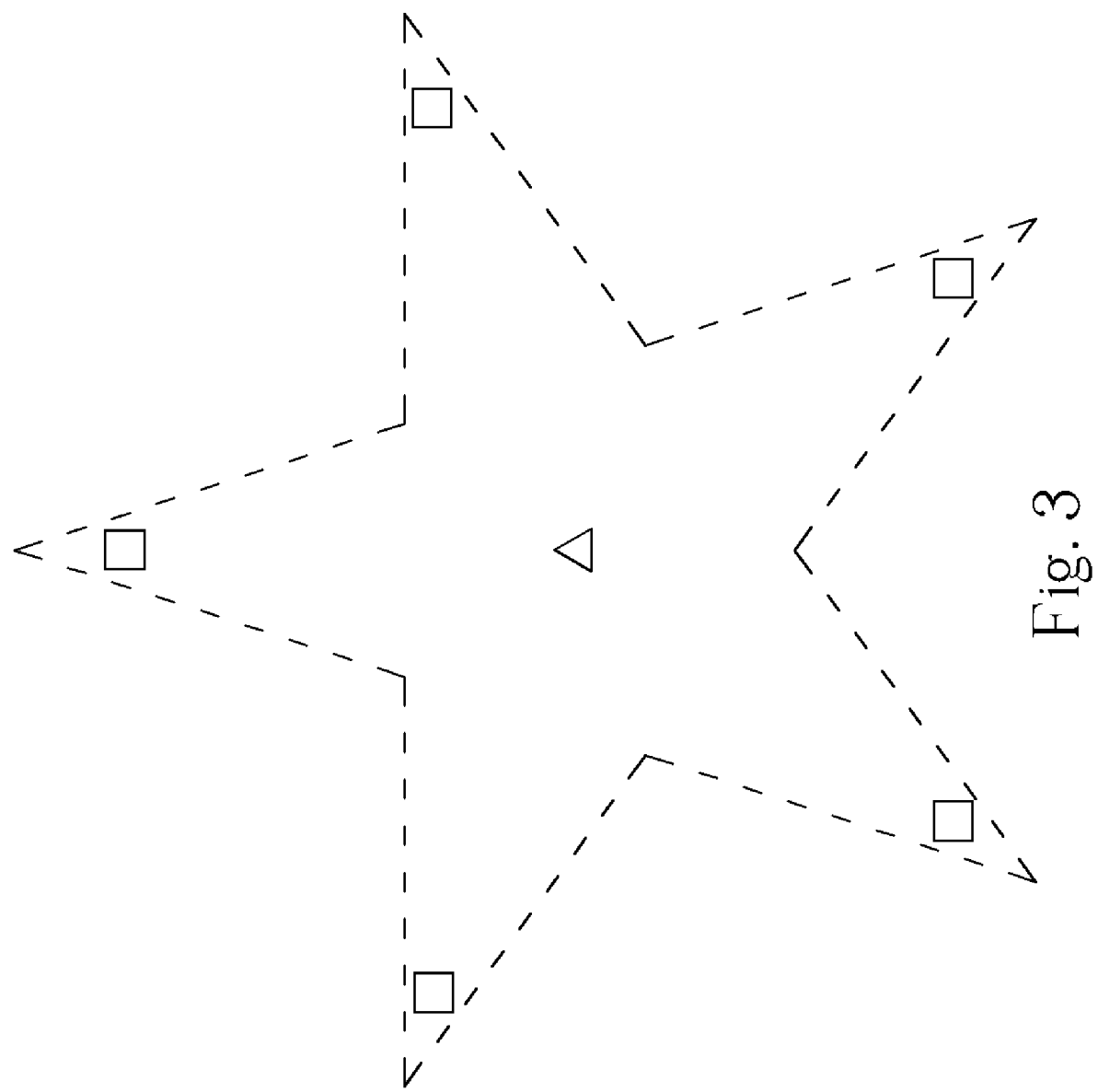
FIG. 3 is a first layout diagram of a video surveillance system according to the present invention.
Figure 4:
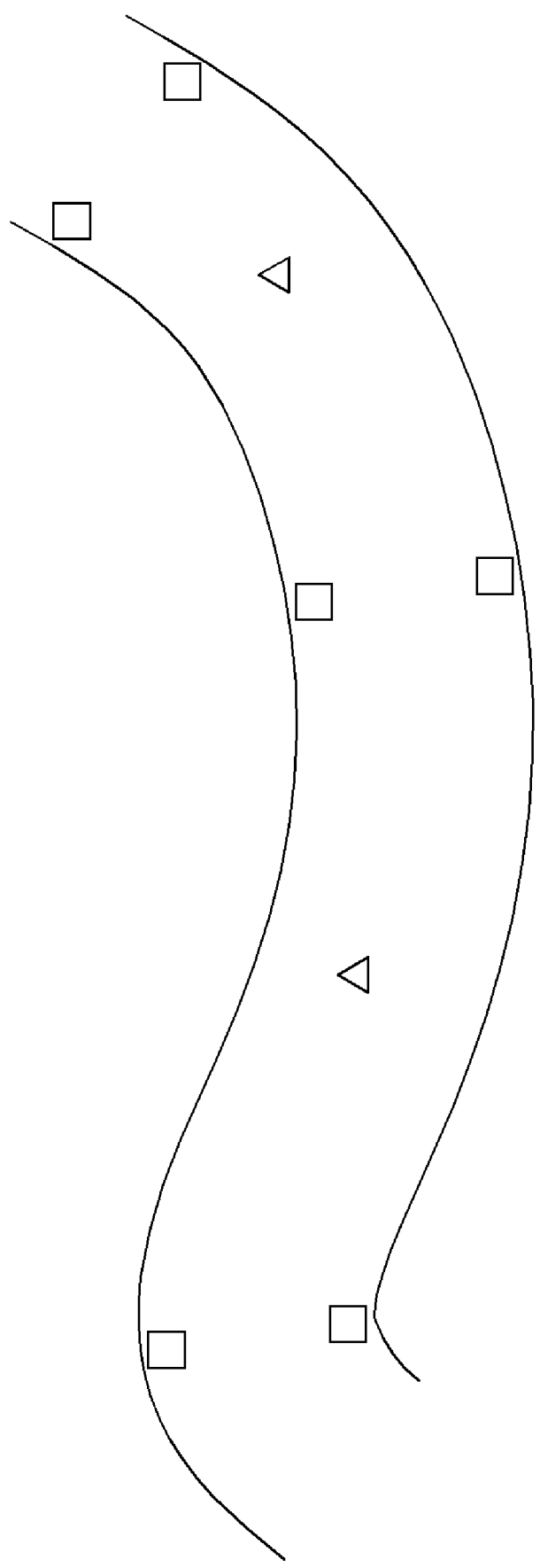
FIG. 4 is a second layout diagram of a video surveillance system according to the present invention.

A video surveillance system of the present invention can have a variety of layout of the cameras in accordance with a topography of an environment where it is installed. For example, if applied to a spacious indoor environment, the video surveillance system can have a star-shaped layout of the cameras. As shown in FIG. 3, a primary camera (can be a fixed camera, or a PTZ camera, indicated by triangle), which is installed in a central region of the star-shaped layout, take the charge of surveillance of the whole environment, and the remaining cameras (indicated by squares), which are installed in a peripheral region consisting of the five star angles of the star-shaped layout, take of charge of the PTZ process of videos located on transform coordinates calculated by and transferred from the primary camera. For another example, if the video surveillance system is applied to a tunnel, as shown in FIG. 4, the primary cameras (more than one in this example and are also indicated by triangles) are installed above a central line of the tunnel, especially a turn of the tunnel, and take charge of the surveillance of the whole environment, and the remaining camera (indicated by squares) are installed in corners of the tunnel and take charge of the PTZ process of videos located on transform coordinates calculated by and transferred from the primary camera.

In contrast to the prior art, the present invention can provide a method for calculating a transform coordinate on a second video of a target object having a target coordinate on a first video and related operation process and video surveillance system. The method comprises the steps of providing a third video surveillance device; generating a third video with the third video surveillance device; selecting a second predetermined number of second reference objects existing in both of the first and the third videos; calculating a plurality of second coordinate transform coefficients of a second coordinate transform function according to a fourth coordinate where the second reference objects are located in the first video and a third coordinate where the second reference objects are located in the third video; and substituting the target coordinate into the second coordinate transform function, which has the second coordinate transform coefficients, and calculating a transform coordinate where the target object is located in the third video. Through the performing of a PTZ process on a video having the transform coordinate on the second video, a user of a video surveillance system for implementing the method can see the face of an intruder, and in the meantime monitor another intruder in an environment where the video surveillance system is installed without any interruption. Moreover, the video surveillance system has a variable disposition of the cameras, instead of a fixed one of the fixed camera 14 and the PTZ camera 16, both of which have to be tightened together and installed nowhere but a small region. Therefore, the video surveillance system of the present invention can be applied to a variety of environment, to achieve a goal of zero dead surveillance space.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for calculating a transform coordinate of a target object on a second image plane, the target object having a target coordinate on a first image plane, the method comprising the following steps of:
   a first video surveillance device generating the first image plane;
   a second video surveillance device generating the second image plane;
   selecting a first predetermined number of first reference objects existing in both of the first and the second image planes;
   calculating a plurality of first coordinate transform coefficients of a first coordinate transform function according to a first coordinate where the first reference objects are located in the first image plane and a second coordinate where the first reference objects are located in the second image plane; and
   substituting the target coordinate into the first coordinate transform function, which has the first coordinate transform coefficients, and calculating the transform coordinate of the target object on the second image plane.

2. The method of claim 1, wherein the transform coordinate is equal to a function value of the first coordinate transform function when the target coordinate is substituted into the first coordinate transform function.

3. The method of claim 1, wherein the first predetermined number is equal to four.

4. The method of claim 3, wherein the first coordinate transform function is a Helmert coordinate transform function.

5. The method of claim 1, wherein the first predetermined number is equal to six.

6. The method of claim 5, wherein the first coordinate transform function is an Affine coordinate transform function.

7. The method of claim 5, wherein the first coordinate transform function is a second-ordered coordinate transform function.

8. The method of claim 1, wherein the first predetermined number is equal to eight.

9. The method of claim 8, wherein the first coordinate transform function is a Projection coordinate transform function.

10. The method of claim 8, wherein the first coordinate transform function is a Pseudo Affine coordinate transform function.

11. The method of claim 1, wherein the first coordinate transform function is a polynomial coordinate transform function $$x_1 = \sum_i \sum_j a_{ij} x^{i-1} y^{j-1}, \ y_1 = \sum_i \sum_j b_{ij} x^{i-1} y^{j-1},$$

and the first predetermined number is equal to a total sum of $a_{ij}$ and $b_{ij}$.

12. The method of claim 1, wherein the first reference objects are selected from an object video group consisting of a plurality of object videos, all of which are located in a peripheral range of an overlapped region, any objects in the overlapped region existing in both of the first and the second image planes.

13. The method of claim 1, wherein the first video surveillance device is a fixed camera.

14. The method of claim 13, wherein the second video surveillance device is a fixed camera.

15. The method of claim 13, wherein the second video surveillance device is a Pan/Tilt/Zoom (PTZ) camera.

16. The method of claim 15, wherein the PTZ camera comprises one of three functions of a Pan function, a Tilt function, and a Zoom function.

17. The method of claim 15, wherein the PTZ camera comprises two of three functions of a Pan function, a Tilt function, and a Zoom function.

18. The method of claim 15, wherein the PTZ camera comprises a Pan function, a Tilt function, and a Zoom function.

19. The method of claim 1, wherein the first video surveillance device is a PTZ camera.

20. The method of claim 19, wherein the second video surveillance device is a fixed camera.

21. The method of claim 19, wherein the second video surveillance device is a PTZ camera.

22. The method of claim 1 further comprising the following steps of:
providing a third video surveillance device;
the third video surveillance device generating a third image plane;
selecting a second predetermined number of second reference objects existing in both of the first and the third image planes;
calculating a plurality of second coordinate transform coefficients of a second coordinate transform function according to a fourth coordinate where the second reference objects are located in the first image plane and a third coordinate where the second reference objects are located in the third image plane; and
substituting the target coordinate into the second coordinate transform function, which has the second coordinate transform coefficients, and calculating a transform coordinate where the target object is located in the third image plane.

23. The method of claim 22, wherein the third video surveillance device is a fixed camera.

24. The method of claim 22, wherein the third video surveillance device is a PTZ camera.

25. The method of claim 22, wherein the second predetermined number is not equal to the first predetermined number.

26. The method of claim 22, wherein the second predetermined number is equal to the first predetermined number.

27. The method of claim 26, wherein the second coordinate transform function is different from the first coordinate transform function.

28. The method of claim 26, wherein the second coordinate transform function is the same as the first coordinate transform function.

29. The method of claim 22 further comprising the following steps of:
providing a fourth video surveillance device;
the fourth video surveillance device generating a fourth image plane having a fourth target coordinate where the target object is located at the fourth target coordinate;
selecting a third predetermined number of third reference objects existing in both of the fourth and the second image planes;
calculating a plurality of third coordinate transform coefficients of a third coordinate transform function according to a fifth coordinate where the third reference objects are located in the fourth image plane and a sixth coordinate where the third reference objects are located in the second image plane; and
substituting the fourth target coordinate into the third coordinate transform function, which has the third coordinate transform coefficients, and calculating a transform coordinate where the target object is located in the second image plane.

30. The method of claim 1 further comprising the following steps of:
providing a fourth video surveillance device;
the fourth video surveillance device generating a fourth image plane having a fourth target coordinate where the target object is located at the fourth target coordinate;
selecting a third predetermined number of third reference objects existing in both of the fourth and the second image planes;
calculating a plurality of third coordinate transform coefficients of a third coordinate transform function according to a fifth coordinate where the third reference objects are located in the fourth image plane and a sixth coordinate where the third reference objects are located in the second image plane; and
substituting the fourth target coordinate into the third coordinate transform function, which has the third coordinate transform coefficients, and calculating a transform coordinate where the target object is located in the second image plane.

31. The method of claim 30, wherein the fourth video surveillance device is a PTZ camera.

32. The method of claim 30, wherein the third predetermined number is not equal to the first predetermined number.

33. The method of claim 30, wherein the fourth video surveillance device is a fixed camera.

34. The method of claim 30, wherein the third predetermined number is equal to the first predetermined number.

35. The method of claim 34, wherein the third coordinate transform function is different from the first coordinate transform function.

36. The method of claim 34, wherein the third coordinate transform function is the same as the first coordinate transform function.

37. The method of claim 1, wherein the first predetermined number of first reference objects are coplanar, and the method further comprising the following step of:

displaying the transform coordinate on an electronic map.

38. The method of claim 1 further comprising the following steps of:

providing a first display for displaying the first image plane;

providing a second display for displaying the second image plane;

displaying the target coordinate on the first display; and displaying the transform coordinate on the second display.

39. A video surveillance system for implementing the method of claim 1.

* * * * *